3,049,458
DECORATIVE LAMINATES
Paul E. Willard, Baltimore, Md., assignor to FMC Corporation, a corporation of Delaware
No Drawing. Filed July 3, 1959, Ser. No. 824,766
4 Claims. (Cl. 154—47)

This invention relates to a novel process for the manufacture of decorative laminates, and to the new and improved products produced thereby. More particularly, this invention relates to a method of manufacturing decorative laminates having a single ply of sheet material laminated to a rigid core material, and characterized by a highly glossy and durable resin surface.

Decorative laminates, in general, have an external coating of decorated paper or other material, laminated to a core which has the properties of strength and workability required for the particular application. Many resinous and plastic materials have been used as the coating and bonding agents for decorative laminates. The ideal material would be one which penetrates the paper, is adhesive to the substrate, and forms a protective film over the decorated paper to guard against abrasion and physical and chemical attack. The laminating resin should also provide a smooth, glossy, attractive surface to the laminate.

Heretofore, satisfactory laminates having a hard, durable and attractive surface have been obtained only through the use of certain thermoset resins, such as melamine-formaldehyde, which require the use of a large number of sheets of laminae, very high pressures during fabrication and cores of high internal strength, in order to produce satisfactory products. The use of melamine-formaldehyde and related resins in the preparation of decorative laminates is accompanied by a number of other processing difficulties. For example, due to the high modulus of melamine resins, and the high shrinkage which occurs during cure of the surface, it is impossible to produce a high gloss surface using melamine without the use of a carrier sheet which is known as overlay paper, the purpose of which is to ensure the mechanical stability of the resin film of melamine-formaldehyde upon the face of the decorative laminate. Further, the construction of a decorative laminate with a melamine surface is complex: a typical construction includes an overlay paper sheet saturated with melamine-formaldehyde resin, over a decorative printed sheet saturated with melamine-formaldehyde resin, over a barrier sheet to prevent migration of phenolic resin into the melamine surface with resulting discoloration, over a series, usually five to seven sheets, of phenolic impregnated kraft paper, over an adhesive sheet to allow the consolidated paper laminate to be adhered to the core, over the core itself, with a series of melamine-formaldehyde impregnated backing sheets including the usual adhesives and barrier sheets on the back side of the laminate in order to produce a board which does not warp. Further, in the handling of the melamine impregnated paper it is necessary to avoid creasing or bending since this paper when impregnated is very brittle. The sheets are subject to considerable dusting, which produces flaws in the finished product. The laminate must be laid out by hand, and each layer must be brushed to remove particles of resins which have flaked off the impregnated paper. The construction is expensive, and requires a great deal of handling and supplies of different materials. The melamines also require high platen pressures, normally 500 to 1500 p.s.i., for curing.

In recent years, other thermosetting materials have been developed, including certain allyl esters of dicarboxylic acids, which may be cured under low platen pressures. However, despite numerous attempts, no convenient procedure has heretofore been developed for the preparation of durable, attractive laminates from these resins, and commercial products have heretofore used melamines, with their complex and expensive construction, to produce durable and attractive decorative laminates.

Thus, although thermoset polydiallyl phthalate has long been recognized as having superior abrasion and heat resistance, and as being unaffected by moisture, ultraviolet light, solvents or harsh chemicals, use of this resin in the field of decorative laminates has been limited by the inability to obtain a durable, glossy surface by simple procedures. Laminates produced heretofore have had resin surfaces which are extremely thin, and characterized by the defects of "dull spots" and pitting. In addition to the resultant poor appearance, the laminate is insufficiently protected against abrasion, and the resistance of the laminate toward contact with water and other liquids is lacking and out of proportion to resistance of the resin itself. Although a variety of methods have been suggested to cure these defects, and to provide for the simple production of laminates with adequate outer coatings of diallyl phthalate resin, none of these offers the advantages of inherent simplicity and startling success that does the method proposed herein. For example, it has been suggested that a finished laminate, prepared by conventional laminating procedures, may be subsequently coated with a diallyl phthalate resin film by applying additional resin-forming material in the desired thickness to its surface, and curing the resin on the surface. It has also been suggested that the surface of the platen be coated with an incompletely cured resin film, and both this resin and the resin used to impregnate the paper be simultaneously cured while in contact. Both of these procedures add additional operations to the normal laminating cycle, and are of dubious practicality and efficacy.

The primary object of the present invention is to provide a simple, convenient and efficient process for the preparation of decorative laminates having an even, protective resin film on the surface.

A further object is to provide a method for obtaining decorative laminates of high gloss and attractiveness, free of the defects of pitting and dull spots.

A further object is to provide a method for obtaining decorative laminates having superior resistance to abrasion and to the action of moisture and household chemicals.

A further object is to provide a method for the manufacture of decorative laminates under relatively low pressures.

Another object is to provide a method for obtaining durable decorative laminates on inexpensive core materials of a wide range of density and compressibility.

Another object is to provide a method for manufacturing decorative laminates which require no further finishing to preserve their gloss and durability.

Another object is to provide a laminating stock suitable for the manufacture of glossy, durable decorative laminates.

A further object is to provide a decorative laminate having an even surface resin film.

These and other objects will become apparent from the following description of this invention.

The laminates produced in accordance with this invention consist of a sheet of paper in a matrix of diallyl phthalate resin, laminated directly to a core material of appropriate strength and rigidity for the application desired. The preparation of these laminates was made possible by the discovery that a relatively small change in diallyl phthalate resin content in the impregnated paper produces a remarkable change in the thickness, and in fact the very existence, of a resin film on the surface of the decorative paper. Within a very narrow range of resin content in the paper, and narrow ratio of polymer to monomer in the impregnant, a single ply of decorative paper may be laminated to a core material in a single simple operation, at pressures approaching contact pressure, to produce a surface of unusual stability and utility, on a large variety of core materials. Decorative laminates prepared according to the process of this invention require neither overlay sheets to provide gloss and protection, nor barrier sheets to separate the decorated paper from the core material. Since the dried laminating stock is flexible, it can be handled in roll form without cracking or dusting. Thus, a simple, convenient process is provided, for the production of decorative laminates having a glossy, durable decorative coating laminated directly to a hardboard core, free of the defects of dull spotting, pitting and staining which heretofore characterized these laminates.

The decorative laminates of this invention are obtained, briefly, by impregnating the decorative paper with 64% to 68% by weight of diallyl phthalate, of which diallyl phthalate 90% to 95% is in the form of a thermoplastic, incompletely cured polymer containing residual unsaturation, and the remaining 5–10% of the diallyl phthalate is monomer. Present also are a peroxide catalyst to complete the cure of the diallyl phthalate to a thermoset resin, a mold release agent if required, and possibly a coloring agent for special effects.

When the decorative paper contains at least 64% by weight of total diallyl phthalate, the laminated product has a uniform, glossy, adherent surface coating of thermoset diallyl phthalate resin. When less than this minimum resin content is used, the defect known as "dull spots," which has characterized previous attempts to prepare decorative laminates using diallyl phthalate, appears. In fact, when less than about 62% of diallyl phthalate is used, there is no resin film at all on the surface of the cured laminate. At 64% to 65% resin, a one to two mil film appears on the surface of five mill paper, accompanied by a highly glossy and durable surface. The sudden appearance of this surface film was most unexpected: consideration of the void space in the paper indicates that an increase of even 3% in the total resin content is not enough mathematically to account for the amount of resin on the surface. When more than about 68% resin is present in the paper, discontinuities in the thickness of the surface resin film are observed, accompanied by loss of gloss and the defect known as "orange peeling."

The resinous component of the laminate is derived from thermosetting polymers of diallyl phthalate. Diallyl phthalate polymerizes by addition polymerization through the allylic unsaturation, first forming a soluble, thermoplastic polymer which is relatively stable and is soluble in a wide variety of organic solvents, and which on further polymerization is changed to an infusible, insoluble thermoset resin having excellent physical and chemical properties.

Thermoplastic diallyl phthalate resin may be prepared by standard polymerization techniques, such as emulsion, solution or bulk polymerization, usually with a peroxide catalyst. The polymerization reaction is relatively slow, and may be stopped before gelation of the polymer, by procedures such as lowering the temperature or quenching the reactants, or destroying the catalyst, to form a thermoplastic polymer which contains residual vinyl unsaturation and is soluble in such common solvents as low molecular weight ketones, dioxane, ethyl acetate, and benzene. The molecular weight of the thermoplastic polymer is generally in the range of about 2500 to 25,000, with a number average below 10,000. A preferred process for the preparation of this polymer is described in U.S. application Serial No. 814,957, filed May 22, 1959.

To obtain the beneficial results described herein, about 90% to 98% of the diallyl phthalate used in impregnating the decorative paper should be in the form of this thermoplastic polymer, and the remaining 2% to 10% as monomer. At over 95% polymer, slightly higher pressures may be needed for adequate flow during curing, to avoid pitting and flaking of the surface; however, when absorbent boards are used as the substrate, it is often preferred to use over 95% polymer, to cut down penetration into the board. At less than 90% polymer, the dried paper becomes sticky.

Present also in the impregnating solution is a catalytic amount, normally about 2% to 5% by weight of diallyl phthalate, of an organic peroxide, to catalyze the final cure of the resin. There is no advantage to the use of more than 5% catalyst. At least about 1% catalyst is required for complete cure. This catalyst may be any organic peroxide or hydroperoxide, such as tertiary butyl perbenzoate, benzoyl peroxide, tertiary butyl hydroperoxide, and other catalysts which are effective at the curing temperature but do not decompose during the drying cycle of the impregnated paper.

It is also preferable to include an effective amount, normally about 2% to 5% by weight of diallyl phthalate, of an internal parting agent, such as lauric acid, carnauba wax or beeswax. External release agents or other processing techniques may also be used.

All of these components are dissolved in a volatile solvent, which may be any of the usual solvents useful for dissolving diallyl phthalate polymer. Useful solvents include low molecular weight ketones such as acetone, methyl ethyl ketone and methyl isobutyl ketone, aromatics such as benzene, toluene, xylene and isopropyl benzene, esters such as ethyl acetate and butyl acetate, other solvents such as dimethyl formamide, and many other solvents which can be evaporated out after impregnation of the paper. It may be preferred to use a mixture of solvents, in order to control the rate of evaporation from the paper. Solutions ranging from about 25% to 70% solids may be used, depending on the particular solvent system used. It is especially convenient to operate in the range of about 35% to 50% solids, for most solvents. The higher the resin concentration, the higher the resin pickup by the paper during impregnation. Since the viscosity of a solution of given resin content depends on the solvent, as well as do the temperature and rate at which the solvent may be evaporated off, the choice of solvent will depend to some extent on the particular processing technique which is adopted for preparing the laminating stock.

The decorative paper may be any of the machine finish saturating papers provided for laminating. These are absorbent papers, pigment-loaded for opacity, printed with solvent resistant and heat resistant inks. Paper of about four to six mils thickness is preferred, having a densometer reading of 50–60 seconds. The Gurley densometer is the standard device for measuring porosity of paper: a densometer reading of 50–60 seconds describes the standard so-called "machine finish" paper. In preparing a laminate designed for use under especially rigorous conditions, such as for counter tops, an overlay paper may be used.

The paper may be impregnated using conventional equipment and techniques, wherein the paper is passed through a tank containing the impregnating solution. The amount of resin pickup may be controlled by adjusting the rate of passing the paper through the solution, varying the type of solvent system employed and the percent solids in the impregnating solution, or using metering rolls, doctor blades, transfer rolls, or other standard saturating techniques. The impregnation is conveniently carried out at room temperature, followed by evaporation of the solvent at elevated temperature.

Complete impregnation of the paper web is essential, since improper saturation will result in the formation of pits and craters in the surface of the cured laminate, and may even result in delamination through the thickness of the paper. The amount of resin on the paper is readily determined by weighing samples of dried impregnated paper after each dip into the impregnating solution. Since heavily coated papers tend to adhere to the rolls of some types of coaters in commercial use, standard techniques, such as the use of a doctor blade on the unprinted side of the paper so that the thinner film dries rapidly enough not to stick to the rolls, may be employed in practice. To obtain the desired results of this invention, the impregnated paper should contain 64% to 68% by weight of diallyl phthalate, polymer plus monomer.

After the desired resin content has been obtained in the paper, the impregnated papers are dried to remove the volatile solvent. If the paper has been impregnated by a process requiring more than one dip through the laminating solution, at least a partial drying should be effected between successive dips. The drying temperature should be carefully controlled, to avoid premature cure of the resin at this stage. The drying temperatures and time will, of course, depend on the amount of solvent to be removed, the solvent system used and the speed of the paper through the drying ovens. Drying should be carried out gradually, to avoid the formation of craters in the final product. Drying temperatures in the range of about 150 to 275° F., in a two zone system, will completely remove acetone solvent, whereas slightly higher ranges may be used for other solvents. In general, no more than 8% of volatiles should remain in the paper after drying, with a preferred residual volatile content in the range of 3% to 5%. Residual volatile content, after normal drying, is measured by the weight loss observed on subjecting the dried paper to a temperature of 320° F. for 10 minutes.

These impregnated papers may be bent and rolled without cracking, and cut without flaking or chipping, and may be stored for prolonged periods wthout blocking or advancement in cure.

Decorative laminates can be prepared on almost any core material, of high, medium and low density, employing the process of this invention. Typical core materials include plywood, hardboard, particle board, cement-asbestos and gypsum board. All these boards should have plane and parallel surfaces, and uniform compressibility. The surface of the board to be coated should be sanded smooth if necessary. The board should either be thermally stable at the laminating temperature, or special precautions may be required. For example, if a urea formaldehyde resin binder is present, or the boards are of high moisture content, it is preferred to pre-dry the boards to a minimum moisture and volatile content. Since it is desirable to avoid steam formation and the formation of other volatiles during lamination, for example, the calcining of gypsum board with heat, such boards should be pretreated before lamination.

To prevent warping, either the core material should be balanced with a resin surface on both sides, or the reverse side should be protected with some inexpensive resin film, typically a sheet of phenolic resin impregnated kraft paper with a glassine paper separator. The type and character of the core material used in the decorative laminate will determine the extent to which balancing or equalization is required. All types of hardboard and most plywoods must be balanced to a greater or lesser degree to compensate for the slight resin shrinkage that occurs in the decorative face and to equalize the rate of water absorption through the two faces. Boards which have a high internal bond strength and a high resistance to moisture do not require extensive balancing. Certain types of particle board, particularly those with high resin content outer faces, or wood veneered faces, may not require additional equalization.

Laminating may be accomplished using a standard platen press with multiple openings. Layers of decorative board can be cured either "face-to-face," using a polishing plate finished on both sides, or "back-to-back" using two polishing plates, each finished on one side only. Either stainless steel or aluminum cauls, both satin and gloss finished, may be used. The cauls should be "broken in" by the use of an external mold release on the first several pressings. Thereafter no external release is necessary during a continued operation.

The impregnated paper is laminated to the board at a temperature and pressure and for a time sufficient to convert the diallyl phthalate to a thermoset resin. The laminating pressure need only be high enough to consolidate the resin and to provide small amounts of flow, and will depend upon such factors as the density and surface of the core and the flow characteristics of the impregnated paper. Pressures approaching contact pressure, and as high as 450 p.s.i., have been used successfully. At low laminating pressures diallyl phthalate resin flows sufficiently to produce a uniform finish of any desired gloss. For most laminates a convenient pressure is in the range of 100–250 p.s.i. Where maximum resin flow is required, such as with rough veneered cores, best results are obtained when the laminating pressure is increased to about 250–300 p.s.i. If it is desired to laminate at pressures in excess of 350 p.s.i., it may be advisable to use paper in which the resin flow has been retarded by advancing the cure of a small portion of the resin during the drying operation, since high laminating pressures are known to reduce the thickness of the resin film on the laminate. However, as previously stated, with impregnated papers containing less than about 64% resin, no resin film at all is obtained, even at very low laminating pressures.

The curing temperature should be high enough to activate the catalyst, and to provide a reasonable rate of cure. For commercial operation, the shorter the curing cycle the greater the productivity, so that high curing temperatures are preferred from practical considerations. In practice the maximum laminating temperature is controlled by the stability of the core. Curing temperatures up to 400° F. for up to five minutes have been used without charring such core materials as "Masonite." Lower temperatures of course require a longer curing time, and temperatures as low as 200° F. have been used for prolonged periods. A temperature range of about 250° F. to 400° F. is preferred, and within this range the rate of polymerization is reasonable, with no significant decomposition and degradation of the laminates. It is not necessary to cool the cured laminate in the press before removal.

The laminates thus produced have a flat, undistorted surface, since volumetric shrinkage is less than 1% in advancing from the thermoplastic resin to the fully cross-linked, thermoset polymer. The surfaces may be glossy or satin finish, depending on the caul surfaces employed. The products have high dimensional stability, and outstanding resistance to abrasion, heat, wear, weathering, and the action of harsh chemicals.

The practice of this invention is illustrated further in the following examples. All parts are by weight unless otherwise indicated.

*Example I*

A typical diallyl phthalate thermoplastic polymer, used in this and the succeeding examples, was prepared as follows: 8860 pounds of monomer, 622 pounds of isopropanol (91% by volume) and 75 pounds of hydrogen peroxide (50.4% $H_2O_2$) were charged to a 1500 gallon stainless steel reactor, thoroughly agitated and heated to a pot temperature of 104–108° C. at total reflux. After 10 hours the viscosity of the reaction mixture had increased to 27 cps. at 106° C., as measured by a Bendix Ultraviscoson computator. The batch was cooled, to obtain a reaction product having a viscosity of 425 cps. at 25° C. This polymeric reaction product, which consists of approximately 27% polymer, 67% unreacted monomer and 6% isopropanol, was mixed intimately with 48,000 pounds of isopropanol (91% by volume), and the converted polymer precipitated at 0° C. The solid polymer was separated by filtration and dried, to yield a 27.6% conversion of monomer to polymer. Properties of a polymer obtained by this process are:

PPV, cps., at 25° C_____ 354
Softening range_____° C__ 80–105
Iodine No_____ 55
Sp. gr. at 25° C. (ASTM D792–50)_____ 1.267

The PPV given above is the "precipitated polymer viscosity," the viscosity measured at 25° C. of a 25.0% solution of polymer in monomer.

The product is a thermoplastic solid possessing residual unsaturation. It is readily soluble in low molecular weight ketones, benzene, ethyl acetate and other solvents, and insoluble in alcohols, water and aliphatic hydrocarbons. A laminate employing this polymer was prepared as follows:

A printed machine-finish alpha-cellulose paper of five mils thickness was coated by the "dip and flow" method, by passing at the rate of 10 feet per minute into a solution of the following composition:

|  | Parts |
|---|---|
| Diallyl phthalate polymer | 95 |
| Diallyl phthalate monomer | 5 |
| Lauric acid | 3 |
| Tert.-butyl perbenzoate | 3 |
| Acetone | 200 |

The coated paper was dried at 150° F. for 14 minutes, and then passed through the solution again, at the rate of 10 feet per minute. The paper was dried at 250° F. for 7 minutes, to produce a tack-free impregnated paper having a resin content of 65.5% and a volatile content of 4.4%. Resin content was measured by weighing samples of untreated and coated paper and assigning the weight gain as resin content. Percent volatiles was measured as the weight loss after heating for 10 minutes at 320° F. The paper was laminated to a core of Duolux tempered Masonite, a compressed hardboard 0.125 inch in thickness and having a density of 1.1 g./cm.³, which had been pre-dried for 5 minutes at 350° F. The layup consisted of a slip caul (to protect the laminate from the surface of the press platen), followed by a sheet of glassine separator paper and a sheet of phenolic impregnated kraft paper (as a balancing sheet), the Masonite core, the diallyl phthalate impregnated paper, and a polished aluminum caul plate. The layup was cured in a laminating press by heating for 20 minutes at 300° F., under a pressure of 350 p.s.i. The laminate was removed from the press and the cauls stripped off, to produce a smooth, glossy finish laminate. Microscopic examination of a polished section of this laminate showed a smooth, even resin coating of 2 mil thickness on the surface of the laminate. The 60° specular gloss of this sample was 90%, based on black glass as 100%.

*Example II*

A printed absorbent paper, 6 mils in thickness, was impregnated by passing the paper once, at a rate of 5 feet per minute, into a solution of the composition:

|  | Parts |
|---|---|
| Diallyl phthalate polymer | 90 |
| Diallyl phthalate monomer | 10 |
| Lauric acid | 3 |
| Tert.-butyl perbenzoate | 3 |
| Acetone | 150 |

The paper was dried at 190° F. for 15 minutes, to produce a tack-free paper having a resin content of 62% and a volatile content of 4.4%. This paper was laminated to a pre-dried core of Duolux tempered Masonite, in a layup as described in Example I, for 20 minutes at 300° F. under a pressure of 350 p.s.i. The resulting laminate had very bad dull spots and poor gloss. Microscopic examination showed no resin film in a polished section of this laminate. The 60° specular gloss of this sample was 53%, based on black glass as 100%.

Repeating the above experiment, increasing the resin content of the impregnated paper to 64% resin, by a second dip into the laminating solution, resulted in a product having a 2 mil resin film on the surface, and a 60° specular gloss of 93%.

*Example III*

A printed alpha-cellulose paper of six mil thickness was coated by the "dip and flow" method, by passing at the rate of 10 feet per minute into a solution of the following composition:

|  | Parts |
|---|---|
| Diallyl phthalate polymer | 93 |
| Diallyl phthalate monomer | 7 |
| Lauric acid | 3 |
| Tert.-butyl perbenzoate | 3 |
| Tert.-butyl perbenzoate | 3 |
| Methyl ethyl ketone | 175 |

The coated paper was dried at 150° F. for 15 minutes, and then passed through the solution again, at the rate of 10 feet per minute. The paper was dried at 250° F. for 8 minutes, to produce a tack-free impregnated paper having a resin content of 67.5% and a volatile content of 4.0%. This paper was laminated to a ¼" thick three-ply all birch plywood which had been dried for 5 minutes at 350° F. The layup consisted of a slip caul, a sheet of glassine separator paper, a balancing sheet of phenolic impregnated kraft paper, the plywood core, the diallyl phthalate impregnated decorative sheet, and a polished aluminum caul plate. The layup was cured in a laminating press by heating for 6 minutes at 340° F., under a pressure of 200 p.s.i. The resultant laminate showed good surface gloss and a 1 mil resin film on the surface of the laminate.

*Example IV*

A printed alpha-cellulose paper of five mil thickness was coated by passing the paper at the rate of 10 feet per minute into a solution of the following composition:

|  | Parts |
|---|---|
| Diallyl phthalate polymer | 93 |
| Diallyl phthalate monomer | 7 |
| Lauric acid | 3 |
| Tert.-butyl perbenzoate | 3 |
| Acetone | 175 |

The coated paper was dried at 150° F. for 14 minutes, and then passed through the solution again, at the rate of 10 feet per minute. The paper was dried at 250° F. for 8 minutes, to produce a tack-free impregnated paper having a resin content of 67.0% and a volatile content of 3.5%. The paper was laminated to a ⅝" thick medium density particle board which had been pre-dried for 10 minutes at 350° F. The lay-up was the same as in Example I. After a curing cycle of 10 minutes at 340° F. and 200 p.s.i. pressure a glossy finished laminate was obtained. Microscopic examination of polished sections of this laminate showed a uniform resin film of 1.5 mils in thickness across the face of the laminate.

*Example V*

A printed alpha-cellulose decorative paper, 5 mils in thickness, was impregnated by passing the paper, at the rate of 5 feet per minute, into a solution of the composition:

|  | Parts |
|---|---|
| Diallyl phthalate polymer | 91 |
| Diallyl phthalate monomer | 9 |
| Lauric acid | 2 |
| Tert.-butyl perbenzoate | 4 |
| Acetone | 150 |

The paper was dried at 2000° F. for 10 minutes, to produce a tack-free paper having a resin content of 65% and a volatile content of 4.4%. This paper was laminated to a ¼" thick cardboard-faced gypsum board panel which had been pre-dried for 5 minutes at 300° F. The laminating cycle, in a layup as described in Example I, was 15 minutes at 310° F. and 150 p.s.i. pressure. The resulting laminate had a high gloss finish surface. In this case, because of the low internal bond strength of the cardboard facing of the gypsum board, it was possible to delaminate the decorative surface by rupture of the cardboard facing.

*Example VI*

A 5 mil printed alpha-cellulose decorative paper was coated by passing at the rate of 10 feet per minute into a solution of the following composition:

| | Parts |
|---|---|
| Diallyl phthalate polymer | 92 |
| Diallyl phthalate monomer | 8 |
| Lauric acid | 3 |
| Tert.-butyl perbenzoate | 3 |
| Methyl ethyl ketone | 160 |
| Toluene | 40 |

The coated paper was dried at 150° F. for 15 minutes, and then passed through the solution again, at the rate of 10 feet per minute. The paper was dried at 250° F. for 10 minutes, to produce a tack-free impregnated paper having a resin content of 67% and a volatile content of 3.5%. The paper was laminated to asbestos cement board of 3/16″ thickness which had been pre-dried for one and one half hours at 350° F. The layup consisted of a slip caul, a sheet of glassine separator paper, a sheet of phenolic impregnated kraft paper, the board core, the diallyl phthalate impregnated decorative sheet, and a polished aluminum caul plate. The laminating cycle was 6 minutes at 380° F. and 200 p.s.i. pressure. The glossy laminate produced was found to have a uniform resin film approximately 3 mils in thickness on its surface.

It is apparent that this invention is susceptible to numerous modifications within the scope of the disclosure, and it is intended to include such variations within the scope of the following claims.

I claim:

1. The method of producing a durable resin-coated decorative laminate having a single ply of decorative paper coated and laminated to a board core with thermoset diallyl phthalate resin, which comprises the steps of: impregnating a sheet of cellulose decorative paper about 4–6 mils in thickness with a solution comprising (a) diallyl phthalate, 90–98% of said diallyl phthalate being a thermoplastic diallyl phthalate polymer having a molecular weight in the range of 2,500–25,000 and the other 2–10% being diallyl phthalate monomer, (b) a catalytic amount of an organic peroxide, (c) an effective amount of a release agent and (d) a volatile solvent, and drying said impregnated paper, until said paper is impregnated with a total of 64–68% diallyl phthalate, by weight of paper, and has a residual volatile content of less than about 8%, measured as material volatile after heating the dried paper for 10 minutes at 320° F.; laminating the dried impregnated paper to the surface of said board, at a temperature and pressure and for a time sufficient to convert the diallyl phthalate to a thermoset resin, thereby forming a laminate coated with a resin surface about 1–4 mils in thickness.

2. The method of producing a durable resin-coated decorative laminate having a single ply of decorative paper coated and laminated to a board core with thermoset diallyl phthalate resin, which comprises the steps of: impregnating a sheet of cellulose decorative paper about 4–6 mils in thickness with a solution comprising (a) diallyl phthalate, 93% of said diallyl phthalate being thermoplastic polymer having a molecular weight in the range of 2,500–25,000 and the other 7% being diallyl phthalate monomer, (b) a catalytic amount of an organic peroxide, (c) an effective amount of a release agent, and (d) a volatile solvent, and drying said impregnated paper, until said paper is impregnated with a total of 65–67% diallyl phthalate, by weight of paper, and has a residual volatile content of 3–5%, measured as material volatile after heating the dried paper for 10 minutes at 320° F.; laminating the dried impregnated paper to the surface of said board, at a temperature of about 250–400° F. and a pressure of about 50–350 p.s.i., for a time sufficient to convert the diallyl phthalate to a thermoset resin, thereby forming a laminate coated with a resin surface about 1–2 mils in thickness.

3. Dry, flexible laminating stock which comprises cellulose decorative paper of about 4–6 mils thickness impregnated with 64–68% by weight of diallyl phthalate, 90–98% of said diallyl phthalate being thermoplastic polymer having a molecular weight in the range of 2,500–25,000 and the remaining 2–10% being monomer; a catalytic amount of an organic peroxide and an effective amount of a release agent; said decorative paper containing a residual volatile content less than about 8%, by weight of paper, measured as material volatile after heating the dried paper for 10 minutes at 320° F.

4. Dry, flexible laminating stock which comprises cellulose decorative paper of about 4–6 mils thickness impregnated with 65–67% by weight of diallyl phthalate, 93% of said diallyl phthalate being thermoplastic polymer having a molecular weight in the range of 2,500–25,000 and the remaining 7% being monomer; 2–5% of an organic peroxide catalyst and 2–5% of lauric acid, said percentages based on weight of diallyl phthalate; said decorative paper containing a residual volatile content of 3–5%, by weight of paper, measured as material volatile after heating the dried paper for 10 minutes at 320° F.

References Cited in the file of this patent

UNITED STATES PATENTS

| 2,339,058 | D'Alelio | Jan. 11, 1944 |
| 2,343,740 | Birmingham | Mar. 7, 1944 |
| 2,385,911 | Chenicek | Oct. 2, 1945 |
| 2,437,508 | D'Alelio | Mar. 9, 1948 |
| 2,595,852 | Hopper | May 6, 1952 |

UNITED STATES PATENT OFFICE
CERTIFICATE OF CORRECTION

Patent No. 3,049,458                      August 14, 1962

Paul E. Willard

It is hereby certified that error appears in the above numbered patent requiring correction and that the said Letters Patent should read as corrected below.

Column 8, lines 11, 12 and 40, for "Dially", each occurrence, read -- Diallyl --; column 8, line 15, strike out "Tert.-butyl perbenzoate------3"; same column 8, line 69, for "2000° F." read -- 200° F. --.

Signed and sealed this 25th day of December 1962.

(SEAL)
Attest:

ERNEST W. SWIDER
Attesting Officer

DAVID L. LADD
Commissioner of Patents